US010579405B1

(12) United States Patent
Potlapally et al.

(10) Patent No.: US 10,579,405 B1
(45) Date of Patent: Mar. 3, 2020

(54) PARALLEL VIRTUAL MACHINE MANAGERS

(71) Applicant: Amazon Technologies, Inc., Reno, NV (US)

(72) Inventors: Nachiketh Rao Potlapally, Arlington, VA (US); Michael David Marr, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 273 days.

(21) Appl. No.: 13/799,134

(22) Filed: Mar. 13, 2013

(51) Int. Cl.
G06F 9/455 (2018.01)
G06F 21/60 (2013.01)

(52) U.S. Cl.
CPC ........ *G06F 9/45545* (2013.01); *G06F 21/602* (2013.01)

(58) Field of Classification Search
CPC .................... G06F 21/57; G06F 21/50–21/53
See application file for complete search history.

(56) References Cited

U.S. PATENT DOCUMENTS

| 8,316,414 | B2 * | 11/2012 | Datta et al. ................ 726/1 |
| 8,584,229 | B2 * | 11/2013 | Brutch et al. ............... 726/21 |
| 2003/0229794 | A1 * | 12/2003 | Sutton et al. .............. 713/189 |
| 2004/0103299 | A1 * | 5/2004 | Zimmer et al. ............ 713/200 |
| 2005/0138370 | A1 * | 6/2005 | Goud et al. ............... 713/164 |
| 2005/0223220 | A1 * | 10/2005 | Campbell et al. .......... 713/164 |
| 2006/0015869 | A1 * | 1/2006 | Neiger et al. ................ 718/1 |
| 2006/0020781 | A1 * | 1/2006 | Scarlata et al. ............ 713/100 |
| 2006/0021029 | A1 * | 1/2006 | Brickell et al. .............. 726/22 |
| 2007/0016766 | A1 * | 1/2007 | Richmond et al. ......... 713/100 |
| 2007/0094719 | A1 * | 4/2007 | Scarlata ................ G06F 21/53 726/9 |
| 2009/0055641 | A1 * | 2/2009 | Smith ................... G06F 21/57 713/100 |
| 2009/0125974 | A1 * | 5/2009 | Zhang ................... G06F 21/53 726/1 |
| 2009/0133097 | A1 * | 5/2009 | Smith ................... G06F 21/57 726/1 |
| 2013/0125115 | A1 * | 5/2013 | Tsirkin et al. ................ 718/1 |
| 2013/0212575 | A1 * | 8/2013 | Ito et al. ..................... 718/1 |
| 2014/0006776 | A1 * | 1/2014 | Scott-Nash et al. ........ 713/156 |
| 2014/0007181 | A1 * | 1/2014 | Sarin et al. .................. 726/1 |
| 2014/0025961 | A1 * | 1/2014 | Mackintosh et al. ....... 713/189 |
| 2014/0068612 | A1 * | 3/2014 | Torrey ....................... 718/1 |

(Continued)

*Primary Examiner* — Mohammed Waliullah
(74) *Attorney, Agent, or Firm* — Hogan Lovells US LLP

(57) ABSTRACT

A processor on a host machine can concurrently operate a standard virtual machine manager (VMM) and a security VMM (SVMM), where the SVMM has a higher privilege level and manages access to a hardware TPM or other trusted source on the host machine. Such a configuration prevents a compromised VMM from gaining access to secrets stored in the hardware TPM. The SVMM can create a virtual TPM (vTPM) for each guest VM, and can seal information in each vTPM to the hardware TPM. A guest VM or the standard VMM can access information in the corresponding vTPM only through the corresponding SVMM. Such an approach enables the host to securely implement critical security functionality that can be exposed to customers, and provides protection against leakage of customer secrets in case of a security compromise.

24 Claims, 6 Drawing Sheets

(56) References Cited

U.S. PATENT DOCUMENTS

| | | | |
|---|---|---|---|
| 2014/0075494 A1* | 3/2014 | Fadida et al. | 726/1 |
| 2014/0075522 A1* | 3/2014 | Paris | G06F 21/44 726/5 |
| 2014/0208111 A1* | 7/2014 | Brandwine et al. | 713/171 |
| 2014/0208123 A1* | 7/2014 | Roth et al. | 713/189 |
| 2014/0258733 A1* | 9/2014 | Scott-Nash | 713/190 |

* cited by examiner

PARALLEL VIRTUAL MACHINE MANAGERS

BACKGROUND

As an increasing number of applications and services are being made available over networks such as the Internet, an increasing number of content, application, and/or service providers are turning to technologies such as cloud computing. Cloud computing, in general, is an approach to providing access to electronic resources through services, such as Web services, where the hardware and/or software used to support those services is dynamically scalable to meet the needs of the services at any given time. A customer typically will rent, lease, or otherwise pay for access to resources through the cloud, such that the customer does not have to purchase and maintain the hardware and/or software to provide access to these resources. A potential disadvantage to such an approach, at least from a customer point of view, is that the resources typically are at a location under control of the provider of those resources, and thus are out of the direct control of the customer. In order to help ensure that resources allocated to the customer perform tasks only under direction of that customer, it can be desirable to implement various types of security functionality in the cloud environment. Unfortunately, conventional provisioning and virtualization approaches are restricted in the functionality that can be provided, which can limit the ability to prevent unauthorized access to various "secured" locations.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to managing security in a shared computing environment. In particular, various embodiments utilize parallel virtual machine managers (VMMs) to prevent a compromised machine manager from gaining access to secrets stored in a hardware trusted platform module (TPM) or other trusted source. The VMMs can include a standard VMM and a security VMM (SVMM), with the SVMM having a higher privilege level and managing access to the hardware TPM or other trusted source on the host. The SVMM can create a virtual TPM (vTPM) for each guest virtual machine (VM) on the standard VMM, and seal information in each vTPM to the hardware TPM. A guest VM or the standard VMM can access information in the corresponding vTPM only through the corresponding SVMM. Such an approach enables a host to securely implement critical security functionality that can be exposed to customers, as access to a hardware TPM or other trusted source can be monitored and/or regulated. Such an approach also provides protection against leakage of customer secrets in case of a security compromise due to VMM escapes or other such actions.

Various other applications, processes, and uses are presented below with respect to the various embodiments.

Figure 1:
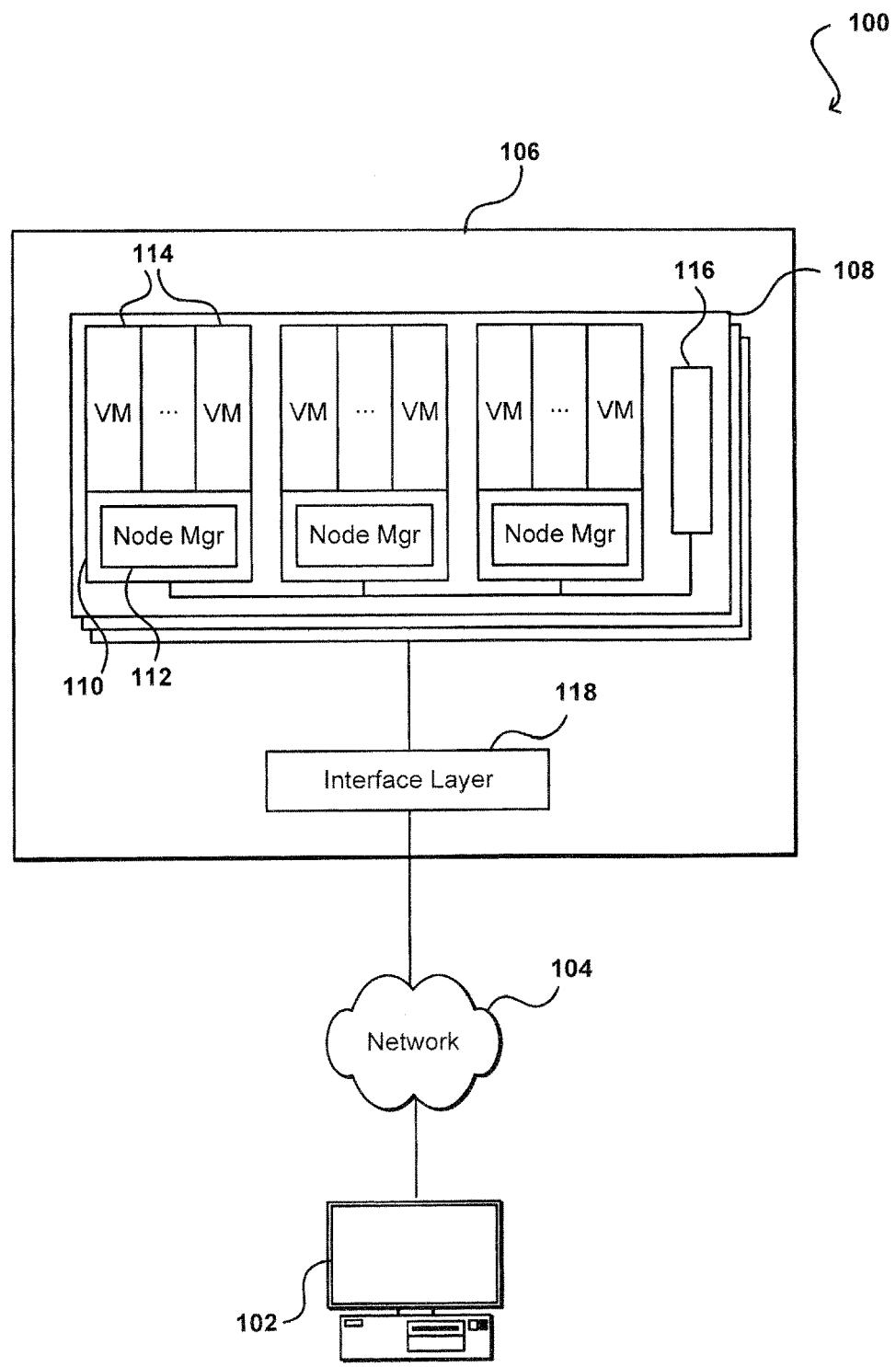
FIG. 1 illustrates an example environment in which various embodiments can be implemented.

FIG. 1 illustrates an example environment 100 in which aspects of the various embodiments can be implemented. In this example, a user is able to utilize a computing device 102 to submit a call or request across at least one network 104 to be received to a shared resource environment 106, such as a data center or "cloud" environment, among other such options. The computing device 102 can include any appropriate device, as may include client devices such as personal computers, cell phones, handheld messaging devices, laptop computers, set-top boxes, personal data assistants, electronic book readers, and the like. The at least one network 104 can include any appropriate wired and/or wireless network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail.

The resource environment 106 in this example includes an interface layer 118, as may include components such as application programming interfaces (APIs), routers, switches, Web servers, and other such components known or used for routing communications from a user computing device 102 to an appropriate resource in the environment. In this example, the resource environment 106 includes a number of racks 108, each rack including a number of host computing devices 110, as well as an optional rack support computing system 116 in this example embodiment. The host computing systems 110 on one of the illustrated racks 108 each host one or more virtual machines 114 in this example, as well as a distinct virtual machine manager 112 associated with the virtual machines on that host computing system. The virtual machine manager (VMM) is tasked with managing the virtual machines (VMs) on the respective host device, and handling various aspects of virtualization. Each virtual machine 114 can act as an independent computing resource for executing one or more tasks on behalf of a user, where the virtual machine functions as a dedicated resource for the user. The environment can also include additional host computing systems that do not include distinct virtual machines, but may nonetheless each act as a computing resource for one or more users. The rack support computing system 116 may provide various utility services for other computing systems local to its rack (e.g., long-term program storage, metering, and other monitoring of program execution and/or of non-local block data storage access performed by other computing systems local to the rack, etc.), as well as possibly to other computing systems located in the environment 106. Each computing system may also have one or more local attached storage devices (not shown), such as to store local copies of programs and/or data created by or otherwise used by the executing programs, as well as various other components.

It will be appreciated that the example of FIG. 1 has been simplified for the purposes of explanation, and that the number and organization of host computing systems and other devices may be much larger than what is depicted in FIG. 1. For example, as one illustrative embodiment, there may be approximately tens of thousands of computing systems in a cloud environment, with at least some of those computing systems being host computing systems that may each host multiple virtual machines.

Figure 2:
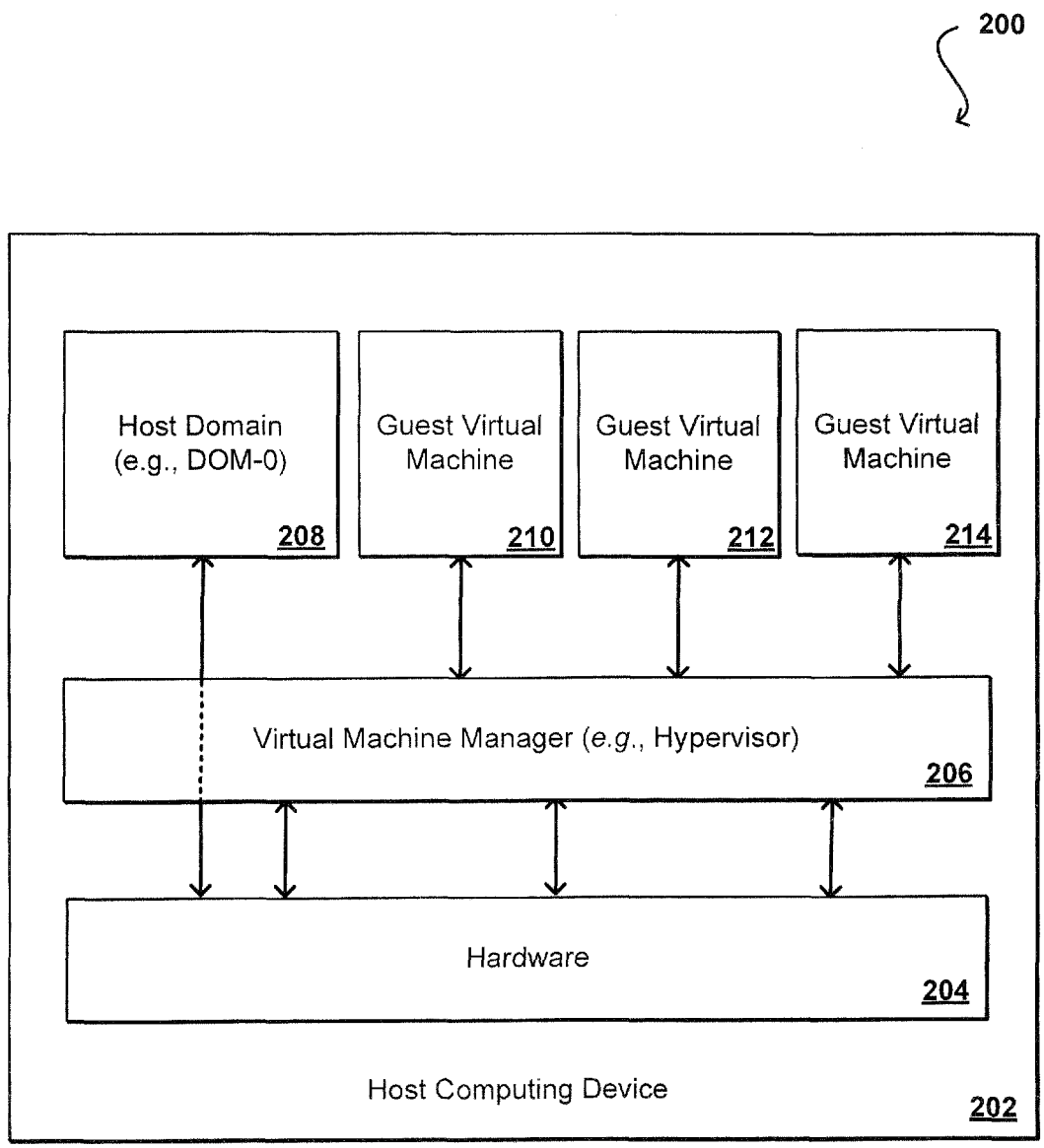
FIG. 2 illustrates an example configuration for a virtual machine manager running multiple guest virtual machines that can be used in accordance with various embodiments.

A number of virtualization techniques can be used to simultaneously operate a plurality of guest virtual machines (VMs) or guest operating systems (OSs) on a given host machine. FIG. 2 illustrates an example 200 of utilizing one virtualization technique using a virtual machine manager (VMM), such as a hypervisor, in accordance with various embodiments. The hardware 204 (e.g., the central processor and other such components) of the host computing device 202 is able to interface with the VMM 206 running directly on the hardware 204, such in the case of a "bare metal" or native hypervisor. Examples of hypervisors useful for such purposes include Xen, Hyper-V®, and the like. Hypervisors typically run at a higher, more privileged processor state than any other software on the machine, and provide services such as memory management and processor scheduling for dependent layers and/or domains. The most privileged of such layers and/or domains resides in the service domain layer, which may include a host domain 208 that may include an administrative operating system for configuring the operation and functionality of the hypervisor 206, as well as that of domains of lower privilege, such as the domains of the guest virtual machines 210, 212, 214 or other operating systems, which may be heterogeneous (i.e., running different operating systems than each other). The host domain 208 (e.g., the DOM-0) may have direct access to the hardware resources 204 of the host computing device 202 by way of the hypervisor 206, while the guest virtual machine domains 210, 212, 214 may not.

In certain embodiments, there can be various modes of operations. For example, to update the microcode on a host computing device, the host computing device can receive a microcode patch or other update from a trusted source and enter a system management mode (SMM), such as by receiving a system management interrupt (SMI) to interrupt normal hypervisor execution. Entering SMM causes the execution of all the physical processor cores except for a single physical core (e.g., the bootstrapping core) in the processor to be suspended in at least some conventional designs. The single physical core that remains executing will be responsible for applying the microcode patch. In some embodiments, it may be ensured that the processor finishes executing all of the microcode for the particular instruction that it was executing at the time of detecting the SMI or other interrupt signal before suspending the execution of the physical cores.

In accordance with various embodiments, the received patch (e.g., for firmware, software, or microcode) can be signed and/or encrypted by a trusted source, such as the service provider or processor manufacturer. In one example, the patch can be signed using a private key or other such credential of a trusted in order to ensure authenticity of the patch. If the patch is signed using a private key, the host computing device may need to validate the signature of the patch before applying the patch. In some embodiments, the public key used to verify the signature can be stored in a trusted platform module (TPM) (not shown) on the host computing device. In some embodiments, the patch can be encrypted using asymmetric or symmetric cryptography. For example, the patch may be encrypted using a public key in order to ensure privacy of the patch. If the patch is encrypted, then any intermediate parties that handle the patch cannot read the patch or ascertain its contents unless they have access to the private key used to the decrypt the patch. If the patch is encrypted, then the private key to decrypt the patch can be stored to the TPM, similarly to the public key for verifying the patch, as previously described. Once the patch is authenticated and/or decrypted, the patch can be applied to the host computing device 202. If SMM is used to apply the patch, then the instructions to apply the patch can be implemented in an SMI handler, or SMI handler can cryptographically verify and call a patch function pre-configured in a hypervisor.

A potential downside to such an approach, however, is that the virtual machine manager (VMM) on a host machine that is exposed to one or more outside users can become compromised. As a result, one of the guest virtual machines (VMs) 210, 212, 214 on the host computing device 202 can potentially access the TPM in the host hardware 204 through the hypervisor 206.

Approaches in accordance with various embodiments can take advantage of the fact that various processors allow for parallel hypervisors executing concurrently on a host computing device. A first, conventional or "normal" hypervisor can be running at the same time as what will be referred to as a "security" hypervisor, or security VMM, that can have higher privileges than the normal hypervisor used for hosting guest instances. The security hypervisor can still be executed according to system management mode (SMM) in response to receiving a system management interrupt (SMI). Using such an approach, however, conventional hypervisor functionality does not have to be suspended in order to perform SMM functionality. Guest VMs on the host then can utilize both the normal and the security VMMs as appropriate, with a potentially higher level of authentication needed to perform tasks via the security VMM.

Figure 3:
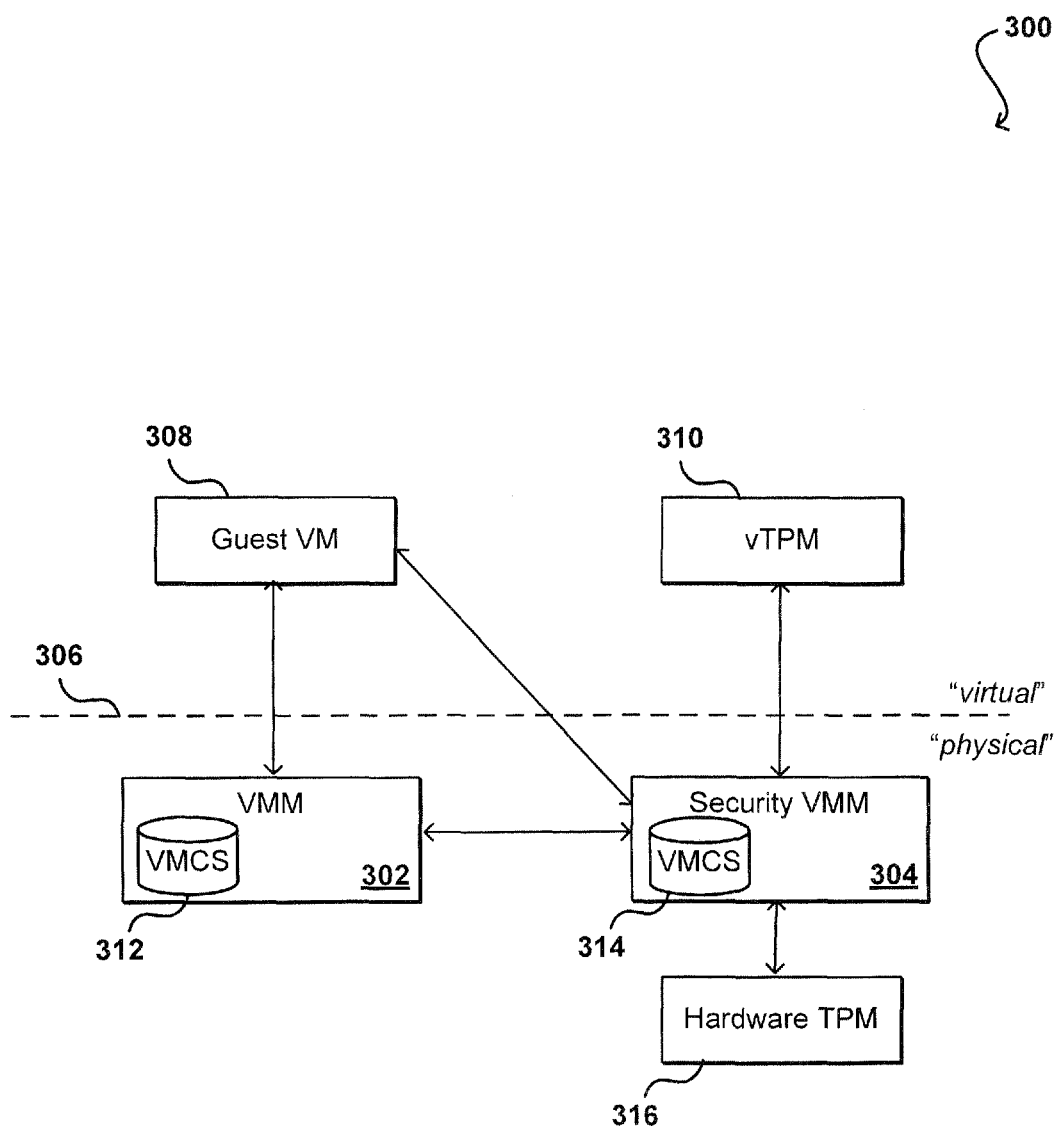
FIG. 3 illustrates an example configuration utilizing parallel virtual machine managers that can be utilized in accordance with various embodiments.

FIG. 3 illustrates an example configuration 300 of one such system that can be utilized in accordance with various embodiments. A dotted line 306 separates the "physical" components from the "virtual" components provided through the virtualization. As discussed, certain processors have virtualization hardware (e.g., Intel VT-x) to support running a security hypervisor or security VMM (e.g., a dual SMM monitor) 304 concurrently with an existing, conventional hypervisor or VMM 302. Each of these hypervisors, or VMMs, can include a dedicated virtual machine control structure (VMCS) 312, 314. As discussed, the security VMM (SVMM) 304 can have higher privileges than the standard VMM 302 used for hosting one or more guest virtual machines 308. The SVMM 304 can be invoked from a guest VM 308 or the standard VMM 302 using, for example, a system management interrupt (SMI) as discussed above. The standard VMM 302 can also use a call, such as a hypercall or VMCALL in some embodiments, to invoke the SVMM. The SMI handlers can be executed in a virtual machine (VM) 310 running on the SVMM 304. On completion of the SMI handler routine, execution can be returned to the guest VM 308 or the standard VMM 302, such as by using a VMRESUME call or similar mechanism.

Leveraging such a mechanism can enable the implementing and utilization of a trusted platform module (TPM) and various security operations, such as key management, using the SVMM 304. The SVMM 304 can have a small code base, and can be vetted thoroughly for security vulnerabilities. Since the SVMM has higher privileges than the standard VMM, the SVMM can access all the memory pages of the standard VMM. However, the standard VMM 302 has no access to the memory pages of the SVMM 304, nor can the standard VMM influence the operation of the SVMM. Thus, implementing the TPM and other security critical functionality via the SVMM can ensure that these operations are secure even in the presence of a standard VMM 302 that may have been compromised due to security attacks.

The SVMM 304 can provide a virtual TPM (vTPM) for any or all guest VMs 308 running on the standard VMM 302, such as by exposing a TPM API. The SVMM can interact with the TPM 316 in the hardware layer of the host machine, or any hardware implementing TPM-like functionality. The SVMM can implement the TPM API in a number of different ways. For example, the SVMM can have a memory page dedicated to each guest VM 308 and standard VMM 302. The SVMM 304 can use a native hypervisor function to implement the TPM functionality, such as by extending platform configuration registers (PCRs), sealing or binding secrets, or performing attestation, and the PCRs can be implemented on the appropriate page. These pages can store information such as boot measurements and secrets for all the instantiated guest VMs and the standard VMM. As another example, the SVMM can have a vTPM instance 310 dedicated to each guest VM 308 and standard VMM 302. Each vTPM instance can implement all the TPM functions, and can store measurements and/or secrets for the respective guest VMs and the standard VMM.

In at least some embodiments, the SVMM 304 is measured and the measurement recorded in PCRs in the hardware TPM 316. In a bootstrapping of trust, the values in the hardware PCRs can be used to verify the SVMM, and the boot measurements stored in virtual PCRs protected by the SVMM can be used to verify the integrity of the guest VMs and the standard VMM. The SVMM can encrypt contents of all the vTPM instances, and seal the encryption keys to the hardware TPM 316. The guest VMs 308 and standard VMM can access the TPM 316 by issuing specially encoded vTPM SMI interrupts to enter the SVMM 304. On receiving the vTPM SMI interrupt meant to access vTPM functionality, the SVMM 304 can verify the source of the SMI interrupt before allowing the guest VMs or the standard VMM to access their corresponding vTPMs, in order to prevent unauthorized accesses.

Figure 4:
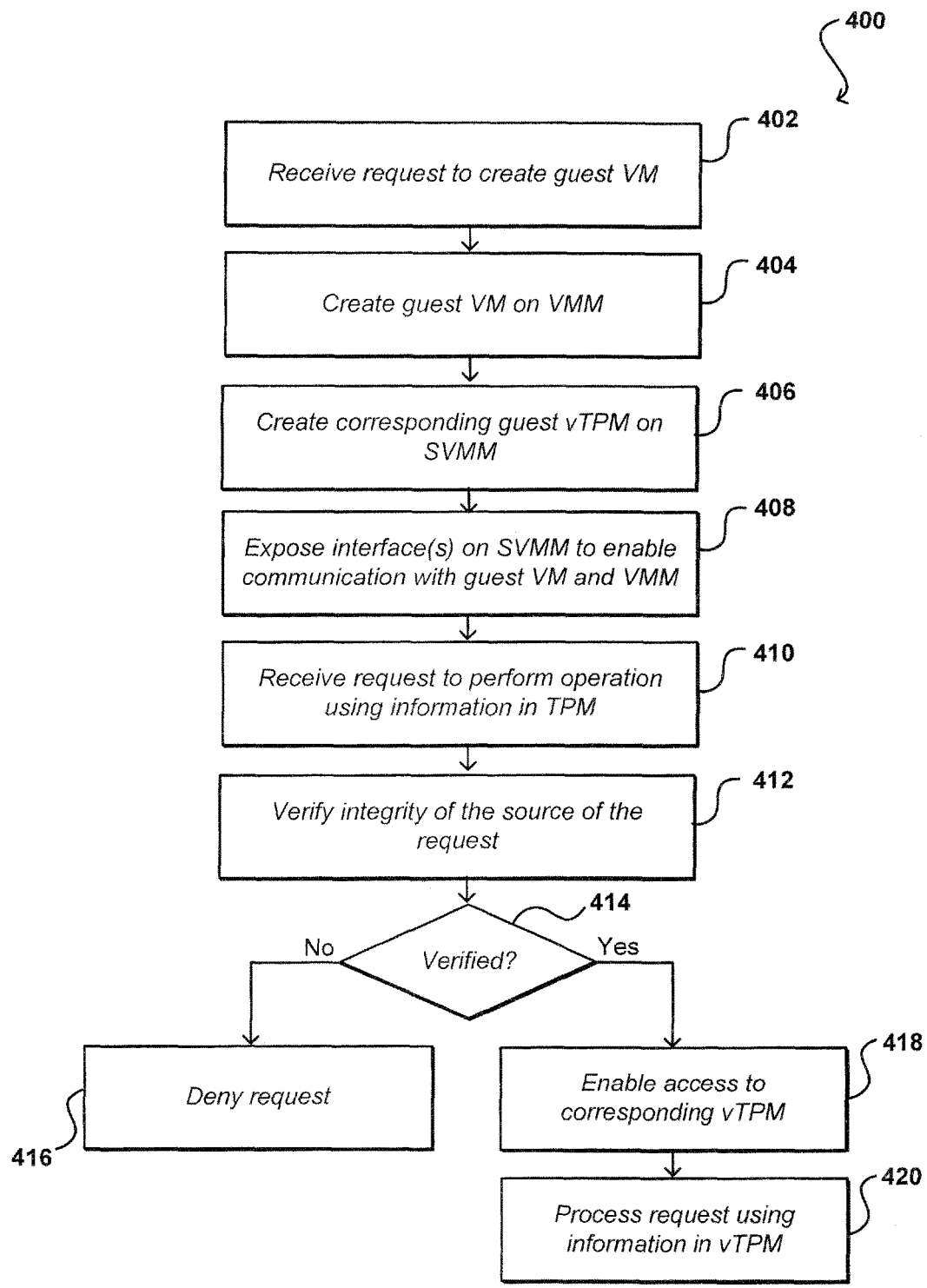
FIG. 4 illustrates an example process for securing access to a trusted source that can be utilized in accordance with various embodiments.

FIG. 4 illustrates an example process 400 for securing access to a hardware TPM or other trusted source that can be utilized in accordance with various embodiments. It should be understood that, for any process discussed herein, there can be additional, fewer, or alternative steps, performed in similar or different orders, or in parallel, within the scope of the various embodiments unless otherwise stated. In this example, a request is received 402 to create a guest VM on a host machine. The guest VM can be created 404 on the appropriate standard VMM, and a corresponding guest vTPM can be created 406 and/or initialized on the corresponding SVMM of the host processor. As discussed, the standard VMM and SVMM can operate concurrently, with the SVMM having higher privilege and controlling access to the hardware TPM, or other trusted source, on the host. One or more interfaces can be exposed 408 on the SVMM in order to enable communications with the guest VM and/or the standard VMM. A request then can be received 410 on one of the interfaces to perform an operation utilizing information in the guest vTPM. As discussed, the request can take the form of a vTPM SMI interrupt or other such request, VMCALL, or other such request, which in at least some embodiments can transfer control to the SVMM. The SVMM can verify 412 the source of the request, such as by authenticating information provided with the request. The SVMM can also determine the integrity of the source of the request, such as by comparing a cryptographic hash from the source to a copy of the hash stored locally. If the source cannot be verified 414 as an appropriate source (e.g., the VMM or the corresponding guest VM), or the source appears to have been compromised, then the request can be denied and no access granted to the vTPM (or hardware TPM). If the source is verified, access to information in the corresponding vTPM can be enabled 416 and the request can be processed using information in the vTPM. As discussed, the operation can include any of a number of different tasks, such as performing encryption or decryption, sealing secrets, or providing attestation, among others. The secrets in each guest vTPM on the SVMM can also be sealed to the hardware TPM, such as where the secrets stored in the vTPM are encrypted and the keys used to encrypt the secrets are stored in the hardware TPM.

In order to support moving guest secrets during live migration, the SVMM can encrypt and sign contents of the vTPM 310 belonging to the guest VM 308 using migration keys provisioned in the hardware TPM 316. These migration keys can be preselected and shared, so as to be initialized in all the hardware TPMs 316 in the cloud infrastructure. By having migration keys shared among the various SVMMs, each SVMM can encrypt and/or decrypt content that has been sent between machines during the migration process, enabling the SVMMs to securely move secrets corresponding to guests being migrated. When the encrypted information is received to the SVMM running on the new server, that SVMM can decrypt the information and reinitialize the vTPM for that guest VM on the new server.

Figure 5:
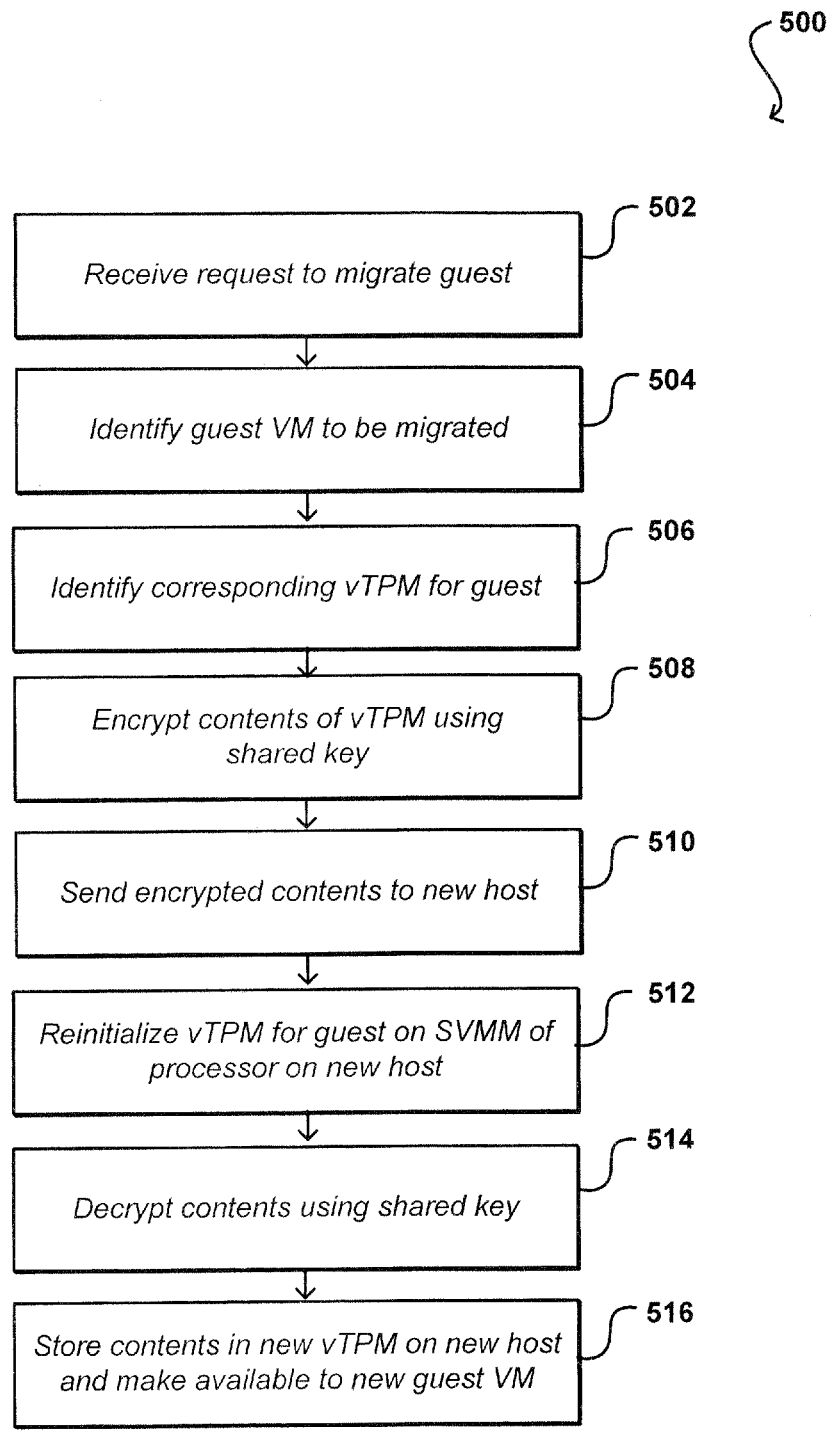
FIG. 5 illustrates an example process for migrating secrets for a guest virtual machine that can be utilized in accordance with various embodiments.

FIG. 5 illustrates an example process 500 for securely migrating a guest VM between hosts that can be utilized in accordance with various embodiments. In this example, a request and/or instruction to migrate a guest VM is received 502 to a processor on a host machine. In response, the guest VM on the standard VMM to be migrated can be identified 504. Similarly, the corresponding vTPM on the SVMM can be identified 506. If there are contents in the identified vTPM, the contents can be encrypted 508 using a shared key provided to the SVMM on at least the current and the target host for the migration. The encrypted contents then can be sent 510 to the appropriate processor on the new host, with the new guest VM, and the vTPM can be reinitialized 512 on the SVMM of the processor on the new host. The SVMM can decrypt 514 the contents using the shared key, and can store 516 the decrypted contents in the reinitialized vTPM. The reinitialized vTPM can also be sealed to the hardware TPM on the new host.

In some embodiments, there might not be a one-to-one correspondence between standard VMMs and SVMMs on a host machine. For example, there can be multiple standard VMMs launched on top of an SVMM on a host. Such an implementation can allow for nested virtualization. Various other implementations can be used as well that take advantage of aspects of the various embodiments.

Figure 6:
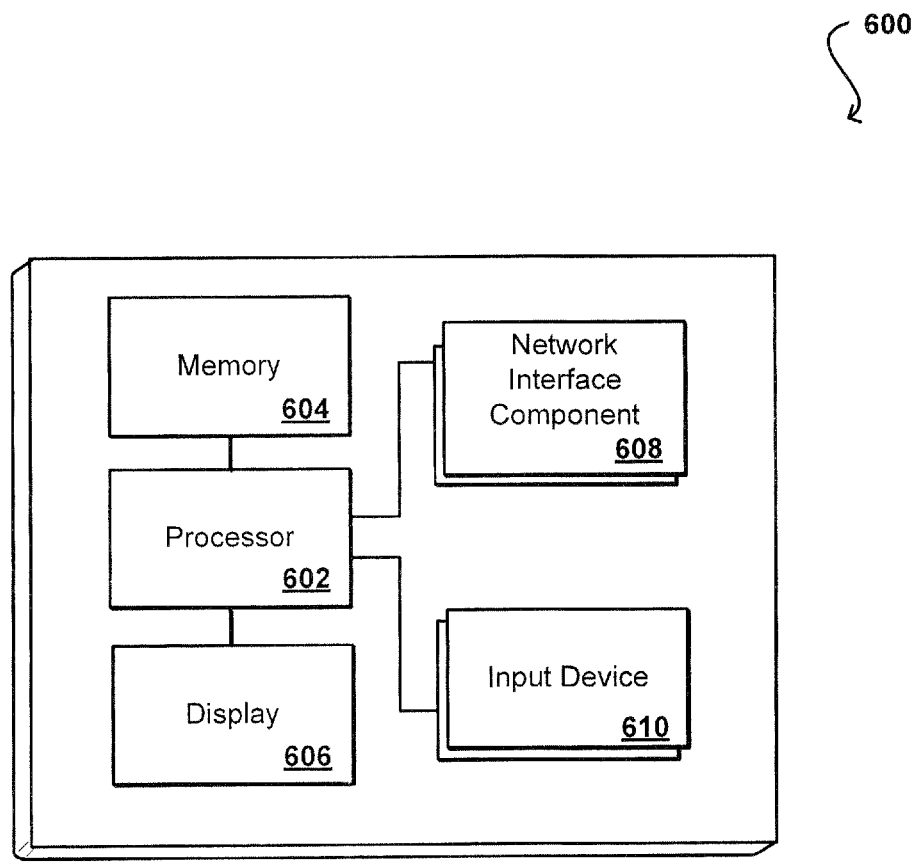
FIG. 6 illustrates example components of a computing device that can be utilized in accordance with various embodiments.

FIG. 6 illustrates a logical arrangement of a set of general components of an example computing device 600. In this example, the device includes a processor 602 for executing instructions that can be stored in a memory device or element 604. As would be apparent to one of ordinary skill in the art, the device can include many types of memory, data storage, or non-transitory computer-readable storage media, such as a first data storage for program instructions for execution by the processor 602, a separate storage for images or data, a removable memory for sharing information with other devices, etc. The device typically will include some type of display element 606, such as a touch screen or liquid crystal display (LCD), although devices such as portable media players might convey information via other means, such as through audio speakers. As discussed, the device in many embodiments will include at least one input element 608 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 600 of FIG. 6 can include one or more network interface elements 608 for communicating over various networks, such as a Wi-Fi, Bluetooth, RF, wired, or wireless communication systems. The device in many embodiments can communicate with a network, such as the Internet, and may be able to communicate with other such devices.

Example environments discussed herein for implementing aspects in accordance with various embodiments are primarily Web-based, as relate to Web services and cloud computing, but it should be appreciated that, although a Web-based environment is used for purposes of explanation, different environments may be used, as appropriate, to implement various embodiments. Client devices used to interact with various embodiments can include any appropriate device operable to send and receive requests, messages, or information over an appropriate network and convey information back to a user of the device. Examples of such client devices include personal computers, smart phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof.

It should be understood that there can be several application servers, layers, or other elements, processes, or components, which may be chained or otherwise configured, which can interact to perform tasks as discussed and suggested herein. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between a client device and a resource, can be handled by the Web server. It should be understood that the Web and application servers are not required and are merely example components, as structured code discussed herein can be executed on any appropriate device or host machine as discussed elsewhere herein.

A data store can include several separate data tables, databases, or other data storage mechanisms and media for storing data relating to a particular aspect. The data store is operable, through logic associated therewith, to receive instructions from a server, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server, and typically will include a non-transitory computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are described. Thus, the depictions of various systems and services herein should be taken as being illustrative in nature, and not limiting to the scope of the disclosure.

Various aspects can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perk Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system for managing access to secure information, comprising:
   a processor, the processor configured to concurrently operate a virtual machine manager (VMM) and a security virtual machine manager (SVMM), the VMM and the SVMM operating in parallel, the SVMM having a higher privilege level on the processor than the VMM, and the SVMM being configured to manage access to a plurality of virtual TPMs (vTPMs) corresponding to a plurality of guest virtual machines (VMs) running on the VMM;
   a trusted platform module (TPM) with stored secret information for a guest virtual machine (VM) running on the VMM; and
   memory storing instructions that, when executed by the processor, cause the system to:
   receive a first request to create the guest VM;
   create the guest VM on the VMM and a corresponding vTPM on the SVMM, the vTPM being sealed to the TPM and holding a copy of the secret information;
   expose, from the SVMM, at least one interface enabling the VMM and the guest VM to submit requests to the SVMM;
   receive, to one of the at least one interface, a second request to perform an operation requiring at least a portion of the secret information;
   identifying, by the SVMM, the vTPM associated with the second request to perform the operation; and
   in response to verifying a source of the second request as one of the VMM or the guest VM, as well as in response to verifying an integrity of the source, allowing access to the at least the portion of the secret information associated with the vTPM and performing the operation using at least a portion of the secret information, wherein the secret information is not accessible from the TPM directly via the VMM.

2. The system of claim 1, wherein the instructions when executed further cause the system to:
   create the plurality of guest VMs on the VMM; and
   create the vTPM on the SVMM for each of the plurality of guest VMs and for the VMM.

3. The system of claim 1, wherein the instructions when executed further cause the system to:
   control, via the SVMM, access to system resources used to execute privileged security functionality.

4. The system of claim 1, wherein the instructions when executed further cause the system to:

verify the integrity of the source by comparing a cryptographic hash, computed by the SVMM from source memory pages, to a copy of a known cryptographic hash available to the SVMM either locally or remotely.

5. A method, comprising:
executing, concurrently on a processor of a host machine, a virtual machine manager (VMM) and a security virtual machine manager (SVMM), the VMM and the SVMM operating in parallel, the SVMM having a higher privilege level on the processor than the VMM, and the SVMM being configured to manage access to a plurality of virtual TPMs (vTPMs) corresponding to a plurality of guest virtual machines (VMs) running on the VMM;
operating a guest virtual machine (VM) on the VMM and a corresponding vTPM on the SVMM;
receiving, to an interface of the SVMM, a request to perform an operation involving information stored in the vTPM;
identifying, by the SVMM, the vTPM associated with the request to perform the operation;
verifying a source of the request as one of the VMM or the guest VM and verifying an integrity of the source; and
allowing access to the information stored in the vTPM and performing the operation using the information stored in the vTPM in response to the source being verified and in response to the integrity of the source being verified, wherein the information is not accessible from the vTPM directly from the VMM.

6. The method of claim 5, wherein verifying the source of the request further includes validating the integrity of the source, the request being denied if the integrity of the source is determined to have been compromised.

7. The method of claim 5, further comprising:
encrypting contents of the vTPM with one or more encryption keys and storing the one or more encryption keys to a trusted platform module (TPM) on the host machine.

8. The method of claim 5, wherein the SVMM has access to memory pages of the VMM but the VMM does not have access to memory pages of the SVMM, and
wherein the vTPM is capable of being implemented as one of the memory pages in the SVMM.

9. The method of claim 5, wherein the request received to the interface of the SVMM is one of an interrupt or a hypercall.

10. The method of claim 9, wherein the interrupt is a system management interrupt (SMI), and further comprising:
processing the SMI using an SMI handler in the vTPM running on the SVMM.

11. The method of claim 5, wherein the operation comprises at least one of encrypting an item, sealing or binding a secret, performing platform measurement, or performing attestation.

12. The method of claim 5, further comprising: receiving an instruction to migrate the guest VM to a second host machine; encrypting, using the SVMM, the information stored in the vTPM on behalf of the guest VM, the information being encrypted with a secret shared among a plurality of host machines; sending the encrypted information to the second host machine, the second host machine having a new vTPM for the guest VM on an SVMM of a second processor on the second host machine; decrypting the information using a copy of the secret stored in the SVMM on the second processor; and storing the information to the vTPM on the second host machine.

13. The method of claim 5, further comprising:
providing the SVMM by operating a portion of the processor in a dual SMM monitor mode.

14. The method of claim 5, further comprising:
creating the plurality of guest VMs on the VMM; and
creating the vTPM on the SVMM for each of the plurality of guest VMs and for the VMM.

15. The method of claim 5, further comprising:
restricting access to the vTPM, an underlying hardware TPM, and one or more privileged resources on the host machine to only the guest VM and the VMM through the SVMM.

16. A non-transitory computer-readable storage medium including instructions that, when executed by a processor, cause the processor to:
execute, concurrently, a virtual machine manager (VMM) and a security virtual machine manager (SVMM), the VMM and the SVMM operating in parallel, the SVMM having a higher privilege level on the processor than the VMM, and the SVMM being configured to manage access to a plurality of virtual TPMs (vTPMs) corresponding to a plurality of guest virtual machines (VMs) running on the VMM;
operate a guest virtual machine (VM) on the VMM and a corresponding vTPM on the SVMM;
receive, to an interface of the SVMM, a request to perform an operation involving information stored in the vTPM;
identifying, by the SVMM, the vTPM associated with the request to perform the operation;
verify an integrity of the request and a source of the request as one of the VMM or the guest VM; and
allow access to the information stored in the vTPM and perform the operation using the information stored in the vTPM in response to the source being verified and the integrity being verified, wherein the information is not accessible from the vTPM directly from the VMM.

17. The non-transitory computer-readable storage medium of claim 16, wherein the instructions when executed further cause the processor to:
encrypt contents of the vTPM with one or more encryption keys and store the one or more encryption keys to a trusted platform module (TPM).

18. The non-transitory computer-readable storage medium of claim 16, wherein the SVMM has access to memory pages of the VMM but the VMM does not have access to memory pages of the SVMM.

19. The non-transitory computer-readable storage medium of claim 16, wherein the request received to the interface of the SVMM is one of an interrupt or a hypercall.

20. The non-transitory computer-readable storage medium of claim 19, wherein the interrupt is an SMI, and wherein the instructions when executed further cause the processor to:
process the SMI using an SMI handler in the vTPM running on the SVMM.

21. The non-transitory computer-readable storage medium of claim 16, wherein the instructions when executed further cause the processor to: receive an instruction to migrate the guest VM to a second host machine; encrypt, using the SVMM, the information stored in the vTPM on behalf of the guest VM, the information being encrypted with a secret shared among a plurality of host machines; send the encrypted information to the second host machine, the second host machine having a new vTPM for the guest VM on an SVMM of a second processor on the second host machine; decrypt the information using a copy of the secret stored in the SVMM on the second processor; and store the information to the vTPM on the second host machine.

22. The non-transitory computer-readable storage medium of claim 16, wherein the instructions when executed further cause the processor to:
provide the SVMM by operating a portion of the processor in a dual SMM monitor mode.

23. The non-transitory computer-readable storage medium of claim 16, wherein the instructions when executed further cause the processor to:
create the plurality of guest VMs on the VMM; and
create the vTPM on the SVMM for each of the plurality of guest VMs.

24. The non-transitory computer-readable storage medium of claim 16, wherein the instructions when executed further cause the processor to:
restrict access to the vTPM, an underlying hardware TPM, and one or more privileged security resources on the host device to only the guest VM and the VMM through the SVMM.

\* \* \* \* \*